United States Patent

Kakadjian et al.

[11] Patent Number: 5,925,307
[45] Date of Patent: Jul. 20, 1999

[54] METHOD FOR FORMING ORIENTED PLASTIC PIPE

[75] Inventors: Sarkis J. Kakadjian, Miranda; Carlos A. Villamizar, Caracas; Nelson F. Torres, Miranda, all of Venezuela

[73] Assignee: Intevep, Sa., Caracas, Venezuela

[21] Appl. No.: 08/854,579

[22] Filed: May 12, 1997

Related U.S. Application Data

[51] Int. Cl.$^6$ .................................................... B29C 55/24
[52] U.S. Cl. ...................... 264/560; 264/209.5; 264/562; 264/563; 264/567
[58] Field of Search ................................. 264/209.5, 560, 264/562, 563, 567

[56] References Cited

U.S. PATENT DOCUMENTS

| 4,428,900 | 1/1984 | Riley et al. |
|---|---|---|
| 4,863,670 | 9/1989 | Hoj .......................................... 264/562 |
| 5,449,487 | 9/1995 | Jarvenkyla . |

FOREIGN PATENT DOCUMENTS 371769 6/1990 European Pat. Off. .

OTHER PUBLICATIONS

Plastics and Rubber Processing and Applications, vol. 10, No. 2 (1988) The Drawing Behavior of Polyethylene Terephthalate Tube, By A. Selwood et al.
Plastics and Rubber Processing Applications, vol. 10, No. 2 (1988) The Preparation and Properties of Die–Drawn Polyvinylchloride Tubes, by A. Selwood et al.
Plastics, Rubber and Composites Processing and Applications, vol. 15, No. 1 (1991) The Production and Properties of Die–Drawn Biaxially Oriented . . . , by A.K. Taraiya et al.
Plastics, Rubber and Composites Processing and Applications, vol. 19, No. 1 (1993) The Development of Continuous Large–Scale Die Drawing for . . . , by C.C. Morath et al.
Plastics and Rubber Processing and Applications, vol. 11, No. 4 (1989) The Production and Properties of Die–Drawn Polyethylene Pipe, by A. Selwood et al.
Plastics and Rubber Processing and Applications, vol. 10, No. 2 (1988) The Preparation and Properties of Die–Drawn Polyvinylchloride Tubes, by A. Selwood et al.
Plastics, Rubber and Composites Processing and Applications, vol. 21 (1994) High Strength Oriented MDPE Pipes, by S.A. Hansard et al.
Plastics and Rubber Processing and Applications, vol. 8, No. 1 (1987) The Production of Oriented Polymer Tube by the Die–Drawing Process, by A. Selwood et al.

*Primary Examiner*—Leo B. Tentoni
*Attorney, Agent, or Firm*—Bachman & Lapointe, P.C.

[57] ABSTRACT

A method and apparatus for forming an oriented plastic pipe from a plastic tubular material includes a first heated liquid bath for heating the plastic material to the glass transition temperature and a cooled liquid bath downstream of the heated liquid bath for cooling the plastic pipe after orientation of same.

10 Claims, 1 Drawing Sheet

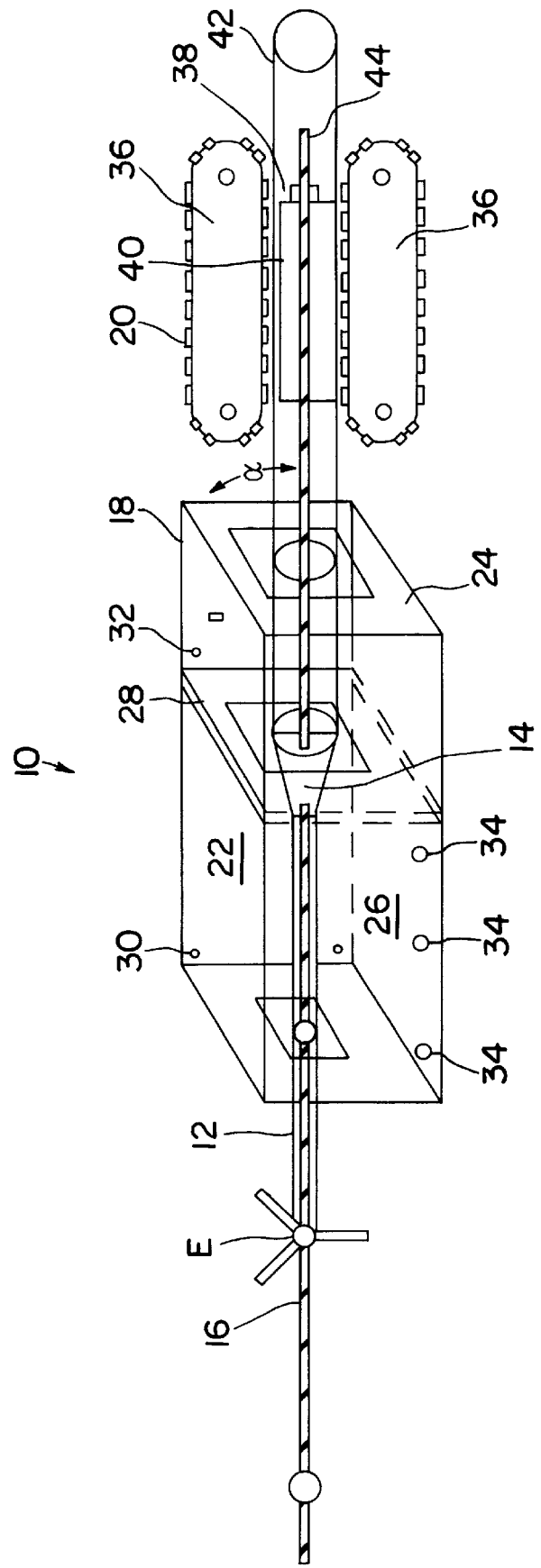

METHOD FOR FORMING ORIENTED PLASTIC PIPE

BACKGROUND OF THE INVENTION

The present invention relates to a method and apparatus for the orientation of plastic pipe and, more particularly, for the orientation of plastic pressure pipes used in oil transportation, natural gas supply, portable water systems, irrigation systems, and chemical plant installations.

The orientation of plastic pipe results in an enhancement in strength of the articles in a given direction by orienting the molecules in the plastic material in that direction. In the case of plastic pipes, orientation is effected in the hoop direction, that is, hoop orientation, whereby the pressure resistance of the plastic pipe increases and/or in the longitudinal direction of the plastic pipe, that is, axial orientation, whereby the tensile strength of the pipe increases.

Methods and apparatus for orienting plastic pipes are known in the prior art. A typical method and apparatus is disclosed in European Patent Application 0 371 769. The method and apparatus disclosed in the '769 patent obtains axially oriented plastic products by drawing a tubular plastic material over a mandrel. The advantage of the method and apparatus of the '769 document is that the tubular material is drawn over an expanding mandrel without the need of liquid lubricants. Related methods and apparatus are discussed in a number of publications of the inventors of the '769 document including the following:

(1) *PLASTICS AND RUBBER PROCESSING AND APPLICATIONS*, Vol. 10, No. 2, 1988, pages 85–91, "The Preparation and Properties of Die-drawn Polyvinylchloride Tubes" by A. Selwood et al.

(2) *PLASTICS AND RUBBER PROCESSING AND APPLICATIONS*, Vol. 25, No. 6, 1996, pages 287–290, "Biaxially Oriented Polymer Tubes by Die Drawing" by A. K. Taraiya et al.

In the methods and systems described above the plastic tubing is heated in an empty chamber by means of electrical heaters. The plastic tubing must be rotated in order to obtain some degree of uniform heating. Because of the foregoing, the amount of time necessary to get the plastic tubing to the required temperature is significant. In addition, the method and apparatus relies on cooling of the mandrel by forced convection air. This results in an inefficient cooling of the plastic pipe after expansion. Inefficient cooling results in unwanted relaxation of the plastic pipe which diminishes the mechanical properties of the final product.

Accordingly, it would be highly desirable to provide a method and apparatus for the orientation of plastic pipe which overcomes the deficiencies noted above.

Accordingly, it is a principal object of the present invention to provide a method and apparatus for the orientation of plastic pipe which results in an efficient uniform heating of the plastic pipe above the glass transition temperature.

It is a further object of the present invention to provide a method and apparatus for the orientation of plastic pipe which provides for a quenching of the oriented plastic pipe so as to eliminate the problem of relaxation associated with the prior art.

It is an additional object of the present invention to provide a method and apparatus which allows for the internal calibration of the orientated plastic pipe so as to prohibit collapse of the oriented plastic pipe as it is drawn off the orienting apparatus by a take-off unit.

Further objects and advantages of the present invention will become apparent hereinbelow.

SUMMARY OF THE INVENTION

In accordance with the present invention, the foregoing objects and advantages are readily attained.

The present invention provides a method of forming an oriented plastic pipe, the method comprises the steps of passing a plastic tubular material to be oriented through a heated liquid bath for uniformly heating the plastic tubular material to a temperature greater than or equal to the glass transition temperature of the plastic tubular material. The plastic tubular material at the glass transition temperature is drawn over mandrel for sizing, shaping and orienting the plastic tubular material so as to form an oriented plastic pipe. The oriented plastic pipe emerging from the mandrel is passed through a cooled liquid bath located immediately downstream of the heated liquid bath and mandrel for quenching the oriented plastic pipe so as to diminish relaxation of the quenched oriented plastic pipe. The quenched oriented plastic pipe is then withdrawn from the cooled liquid bath and passed over an internal calibration billet which prohibits the collapse of the oriented plastic pipe. In accordance with further features of the method of the present invention, the heated liquid bath and cooled liquid bath are maintained at desired temperatures so as to provide the necessary heating and quenching of the plastic material. In accordance with the present invention the heated liquid bath should be maintained at a temperature of greater than or equal to 90° C. while the cooled liquid bath is maintained at a temperature of less than or equal to 25° C. Water is preferably used as the liquid in both the heated and cooled liquid baths. The mandrel for expanding and orienting the plastic tube is located in the heated liquid bath and is separated from the cooled liquid bath by a wall which seals the heated liquid bath from the cooled liquid bath as the plastic material is drawn from the heated liquid bath to the cooled liquid bath.

The apparatus of the present invention for forming an oriented plastic pipe comprises a heated liquid bath, a cooled liquid bath downstream of the heated liquid bath and an internal calibration billet downstream of the cooled liquid bath. A mandrel for sizing, shaping and orienting the plastic pipe is located within the heated liquid bath upstream of the cooled liquid bath. A transport mechanism for passing the plastic pipe through the heated liquid bath, over the mandrel, through the cooled liquid bath and over the internal calibration billet is provided. Heating and cooling mechanisms are provided in the heated liquid and cooled liquid bath for maintaining a uniform, constant temperature of each of the baths so as to heat and cool the plastic as required.

In accordance with the method and apparatus of the present invention, the problems associated with known prior art methods and apparatus for forming an oriented plastic pipe are overcome.

BRIEF DESCRIPTION OF THE DRAWINGS

A detailed description of the preferred embodiments of the invention follows with reference to the drawing which is a schematic illustration of the method and apparatus of the present invention.

DETAILED DESCRIPTION

The apparatus 10 of the present invention is illustrated in the FIGURE and includes a plastic extruder E for providing a plastic tubular material 12 which is to be treated to form an oriented plastic pipe. The apparatus of the present invention includes a mandrel 14 supported on a rod 16 in a manner known in the prior art, such as, for example European Patent Application 0 371 769. The apparatus includes an orienting chamber 18 which will be discussed in detail hereinbelow. Upstream of the orienting chamber 18 is a plastic tubular material feed unit (not shown) for feeding the tubular material to chamber 18. A take-off unit 20 for withdrawing the oriented plastic pipe from the chamber 18 is provided downstream of the chamber 18.

In accordance with the present invention the chamber 18 having side walls 22, end walls 24 and top and bottom walls 26 is divided by interior wall 28 into two compartments 30 and 32. Wall 28 supports in compartment 30 the mandrel for expanding and orienting the plastic tubular material. The wall defines with the surface of the mandrel the die through which the oriented plastic pipe passes into the second compartment 32.

Compartments 30 and 32 are filled with a suitable liquid, preferably water, to form a liquid bath in each of the compartments 30 and 32 respectively. Compartment 30 is provided with heating and circulating mechanisms, shown schematically at 34 for maintaining a heated liquid bath of uniform temperature. In accordance with the present invention, it has been found that for biorienting PVC tubes, the heated liquid bath should be at a temperature of greater than or equal to 90° C. so as to insure the proper heating of the plastic tubular material fed to the heated bath to a temperature ($T_1$) which is greater than or equal to the glass transition temperature of the plastic tubular material. Similar cooling and circulating means (not shown) are provided in compartment 32 for maintaining the cooled bath at a temperature sufficient to quench the oriented plastic pipe emerging from the mandrel in the heated liquid bath to a temperature ($T_2$) 25° C. In accordance with the present invention, the cooled liquid bath must be maintained at a temperature of less than or equal to 25° C. and preferably between 2° C. and 15° C. The cooling bath cools the emerging oriented plastic pipe by a thermal shock quenching which substantially eliminates the relaxation of the oriented plastic pipe which is expanded and oriented as it is fed over the mandrel 14.

In accordance with the present invention the mandrel 14 is sized in such a manner as to provide a hoop expansion of at least five times the axial expansion of the plastic tubular material as it is drawn over the mandrel 14. It has been found that in order to achieve the foregoing axial and hoop expansion, the mandrel should have a taper angle of between about 15° to 30°, the taper angle being designated by the α as shown in the FIGURE. In addition to the foregoing, it is preferred that the mandrel 14 be supported within the heated liquid bath located in compartment 13. By providing the mandrel 14 in the heated liquid bath it is assured that the plastic tubular material is maintained at the minimum temperature ($T_1$) during the expansion of the plastic tubular material over the mandrel 14.

As noted above, wall 28 divides chamber 18 into the two compartments 30 and 32 respectively, the wall 28 effectively seals the two compartments so as to prohibit an intermixing of the heated and cooled liquid baths. The sealing, as is known in the art, is provided by flexible seal means which seal on the plastic pipe as it emerges from the mandrel 14 through wall 28 and into compartment 32. In accordance with the preferred embodiment of the present invention, the mandrel 14 abuts the wall 28 in the heated liquid bath compartment 30. The sealing provided in the wall 28 for sealing the compartments 30 and 32 from each other can be provided by any means known in the art as noted above.

A take off unit 20 for withdrawing the oriented plastic pipe from the chamber 18 is provided downstream of the chamber 18 and cooled liquid bath in compartment 20. The take off unit 20 is a caterpillar type unit as known in the art and comprises two opposed caterpillar tracks 36 which define therebetween a cavity 38. Located in the cavity 38 is an internal calibration billet 40. The use of the internal calibration billet 40 insures that the oriented plastic pipe 42 which drawn off by take off unit 20 does not collapse. The internal calibration billet 40 defines with the caterpillar tracks 36 an opening for transporting the oriented plastic pipe 42. The internal calibration billet 40 is supported on a rod 44 in a manner similar as the mandrel 14 on rod 16 as is known in the art.

The method and apparatus of the present invention has significant advantages over previously known methods and apparatus. The use of the heating bath allows for the uniform heating of the plastic tubular material in a manner far more efficient than heretofore known. The provision of the cooled liquid bath to provide a thermal shock quenching of the oriented plastic pipe diminishes and substantially eliminates the possibility of complete relaxation of the plastic pipe once it leaves the expanding mandrel. This insures superior mechanical properties of the resulting oriented plastic pipe particularly during high velocity drawing operations. Finally, the employment of an internal calibration billet insures that the oriented plastic pipe does not collapse when being drawn by the take off unit 20 out of the chamber 18.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of forming an oriented plastic pipe comprising the steps of:
   (a) passing a plastic tubular material to be oriented through a heated liquid bath for uniformly heating said plastic tubular material to a temperature ($T_1$) of greater than or equal to the glass transition temperature of said plastic tubular material;
   (b) passing said plastic tubular material at said temperature ($T_1$) over a mandrel for sizing, shaping and orienting said plastic tubular material to form an oriented plastic pipe;
   (c) passing said oriented plastic pipe through a cooled liquid bath immediately downstream of said heated liquid bath for quenching said oriented plastic pipe so as to diminish relaxation of said quenched oriented plastic pipe; and
   (d) passing said oriented and quenched plastic pipe from said cooled liquid bath over an internal calibration billet.

2. A method according to claim 1 including the step of maintaining said heated liquid bath at a temperature of greater than or equal to 90° C.

3. A method according to claim 1 including quenching said oriented plastic pipe to a temperature of less than or equal to 25° C.

4. A method according to claim 1 including the step of maintaining said cooled liquid bath at a temperature of less than or equal to 25° C.

5. A method according to claim 1 including the step of providing water as the liquid in the heated bath and the cooled bath.

6. A method according to claim 1 including the step of providing said mandrel with a taper angle (α) of between about 15° to 30°.

7. A method according to claim 1 including the step of locating said mandrel in said heated liquid bath.

8. A method according to claim 7 including the step of providing a housing defining a chamber and wall means for separating the chamber into the cooled liquid bath and the heated liquid bath wherein said mandrel shuts said wall means.

9. A method according to claim 8 wherein said wall means including sealing means for substantially sealing said cooled liquid bath from said heated liquid bath as said plastic pipe passes from said cooled liquid bath to said heated liquid bath.

10. A method according to claim 1 including the step of sizing said plastic pipe wherein hoop expansion is at least five (5) time axial expansion of the plastic pipe.

* * * * *